INVENTOR
JOHN W. IRWIN

BY Bernard M. Goldman
ATTORNEY

United States Patent Office 3,444,541

Patented May 13, 1969

3,444,541

TAPE INTER-BLOCK GAP SIZE CONTROL

John W. Irwin, Huntsville, Ala., assignor to International Business Machines Corporation, Armonk, N.Y., a corporation of New York Filed June 21, 1965, Ser. No. 465,336
Int. Cl. G11b *5/84*
U.S. Cl. 340—174.1 5 Claims

ABSTRACT OF THE DISCLOSURE

This invention measures a start distance component in the inter-block spacing approximately equal to the spacing between the write and read heads or gaps. The write head is actuated with a marker signal in response to a write command that initiates tape movement. Sensing of this mark by the read head is indicative of movement of the tape a distance equal to approximately the distance between the read and write heads or gaps.

This invention relates to controlling the spacing between two adjacent blocks of data as they are being recorded. In particular, this invention relates to controlling the length of inter-block spacing (IBG) when tape is stopped with the head within the IBG.

Inter-block spacing (IBG) and inter-record gap spacing (IRG) have the same meaning within this specification and in the prior art. A data block within this specification also includes synchronization bits, or other housekeeping bits, recorded before or after data bytes or characters within the block; but the term, "data block," excludes bits or marks recorded solely for IBG size control of the type added by this specification.

Fundamentally, the IBG provides space for tape to decelerate to a stop, and thereafter accelerate to nominal velocity while the read and write heads are between data blocks. No data is written in the IBG. The tape must be moving within about plus or minus 5% of nominal velocity for reliably reading or writing data on tape.

In prior tape systems, the IBG length was determined by timing-out fixed periods for either (1) when tape is moved continuously over the IBG, or (2) when tape is stopped in the IBG. In case (1) the IBG is generated with a single time-out from the end of the last block. In case (2) the IBG is generated by a *stop* component followed by a *start* component time-out (start delay). Case (2) is more pertinent background to the subject invention than case (1), since this invention is concerned with the start component of the IBG, and not with the IBG stop component. During a fixed start time-out period (write delay), the tape moves a distance dependent upon the tape acceleration response of the tape drive. However, substantial variation in tape acceleration response exists at different times within the same tape drive as well as among different tape drives. Within the same tape drive acceleration response variations can be caused by programming variations in the time of signalling the next write reinstruction in relation to ending the writing of the last block. Among different drives, acceleration response variations are due to variations in the coefficients of friction and alignment of parts in tape-capstan actuators in manufacture, or caused by wear, time, temperature and humidity.

It is commonly necessary to at least partly write a tape on one tape drive, be able to read it on another tape drive, and be able to write added blocks of data on still another drive at any computer installation.

In order to accommodate this situation, the fixed time-out periods used in prior systems to determine the IBG start component lengths had to be designed to accommodate the tape drive with the *slowest* start response, i.e., longest acceleration time. If this was not done, a tape written on the fastest response drive could not be read on a slower response drive because the IBG would be too short to assure that a tape block would reach the head within 5% of nominal velocity; and read errors might result. Consequently, in prior tape systems, the fastest tape drive might generate an IBG about 50% longer than required by the slowest response tape drive accommodated by the system, using the same fixed period stop and start time-outs.

This invention provides a partial solution to the IBG size variation problem by making the start component of the IBG either entirely or partly a fixed tape-distance determination, instead of the prior fixed time-out determination. A fixed tape-distance determination inherently eliminates variation in any IBG component for which a distance determination can be made.

This invention measures a start-distance component in an IBG approximately equal to the spacing between the write and read head gaps in a particular track. (For many years, commercial digital tape drives have provided a read head gap after a write head gap to read check newly written digital information.) This invention actuates the write head with a marker signal in response to a write command that signals tape to move (tape-go signal). This write gap marker is recorded prior to or very quickly after the starting of any relative movement between the head and tape. After the tape has begun to move, the first sensing of this recorded marker signal by the read-head gap, following in the same track, is the signal indication that the write head gap has moved a fixed distance from the marker along the tape. This fixed distance is independent of the acceleration response of the tape drive; and hence, it will be the same for both the fastest-response and the slowest-response tape drives. The sensed marker signal is used to determine when writing begins for the data block. Writing can begin immediately after sensing the marker signal, or it can be delayed by a fixed amount therefrom; the controlling factor generally being to choose the shortest distance in which the tape drive with the slowest expected acceleration response can reach approximately nominal tape velocity when writing begins, excluding the marker signal. If this fixed distance is too short, the spacing between write and read head gaps can be increased (which is generally undesirable for other reasons), or a short fixed time-out can be added at the end of the fixed distance. A short added time-out has a much smaller IBG error tolerance than a time-out generating the entire IBG start distance component.

This invention also involves a time measurement in relation to the writing and subsequent reading of the marker signal. This time measurement can be used to determine the start acceleration response of a tape drive, i.e., whether fast, slow or in between; and this start acceleration response can be used in a number of ways. For example, it can be used to monitor the particular tape-drive capstan response by signalling if tape has not reached proper velocity when writing begins. Secondly, this time measurement can be used to select among plural IBG start component time-outs that begin upon the write command to obtain a substantially fixed distance IBG start component under various tape drive response conditions.

It is, therefore, an object of this invention to reduce variation among tape drives by making the start component of an inter-block gap either partly or entirely a distance function.

It is another object of this invention, to make an IBG start component a distance equal essentially to the distance between read and write head gaps in a particular tape track.

It is a further object of this invention to measure time in relation to an IBG fixed distance start component.

It is still another object of this invention to provide a time measurement in relation to a fixed start distance on tape to check the acceleration response of a tape drive.

It is still a further object of this invention to measure time in relation to a fixed start distance on tape to indicate a tape-drive capstan response failure.

It is a further object of this invention to measure time in relation to a fixed start distance on tape to enable selection among different IBG start write delays to obtain a substantially equal IBG start component distance under all stop and start tape conditions.

The foregoing and other objects, features and advantages of the invention will be apparent from the following more particular description of the preferred embodiments of the invention, as illustrated in the accompanying drawings.

Figure 9:
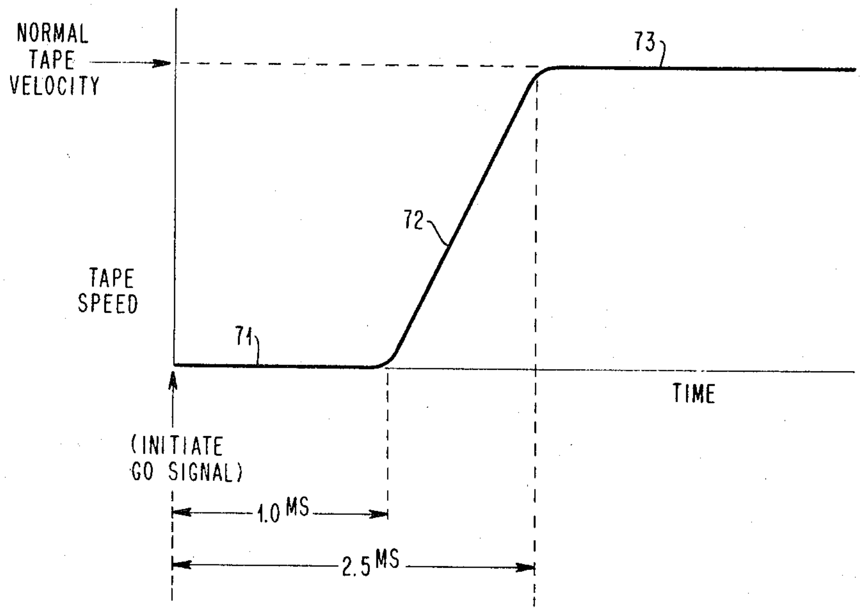

FIGURE 9 provides a graph representing a capstan acceleration response.

Figure 1:
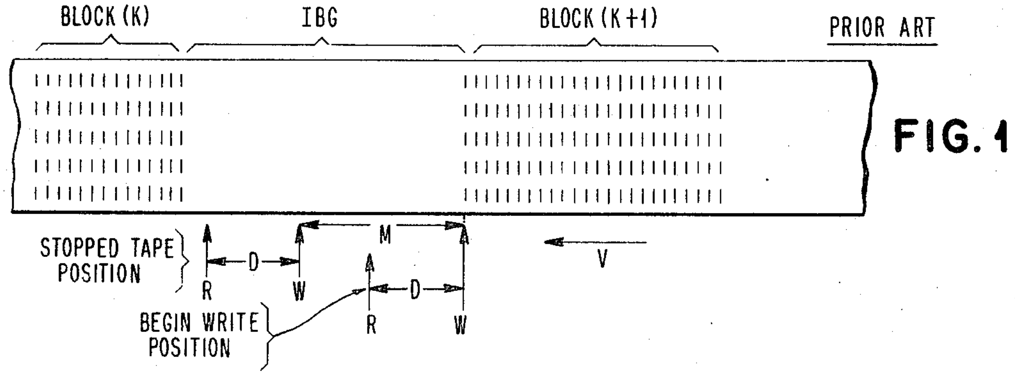
FIGURE 1 represents prior art operation of IBG generation.

The prior art is represented in FIGURE 1.

At the completion of writing a data block (K), a write disconnect signal is provided by the computer, and the tape-go signal is dropped. In response, the tape drive applies a brake to the tape. The tape decelerates to the stopped position shown in FIGURE 1 with the read and write head in the inter-block gap (IBG), the write head is stopped near the center of the IBG. The tape may remain stopped as long as required. When the computer program determines that the next block $(K+1)$ is to be written, a write instruction is provided to the tape control for the respective tape drive, and the tape-go signal is activated to energize the tape drive capstan actuator. A write delay time-out N, such as three milliseconds, is also activated by the write command to prevent writing data on tape until the tape has been allowed time N in which to accelerate to nominal velocity. Thus, during the write delay N, the tape begins to move and accelerates to nominal velocity. At the end of time N, tape has moved the distance M shown in FIGURE 1, which is the IBG start component. Time-out N is chosen so that even the slowest expected tape drive can reach substantially nominal velocity during the period N. After the time-out N, writing starts for block $(K+1)$. Accordingly, the only means used in prior art FIGURE 1 for generating the IBG start component distance M is a fixed time-out N, such as was derived from a single-shot or a delay counter.

Figure 2:
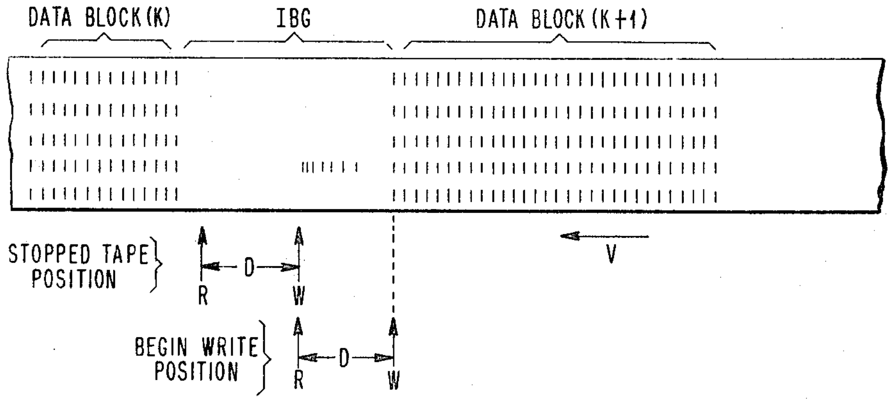
FIGURES 2 and 3 represent IBG generation using the subject invention.

FIGURE 2 illustrates the start technique used by this invention; the tape stop technique is the same as provided for FIGURE 1. In FIGURE 2, a data block K has just been written, and the tape has been brought to a halt in the manner explained for FIGURE 1 with the read and write gaps in the stopped position indicated in FIGURE 2. The tape may remain stopped as long as required. When the computer program determines that the next data block $(K+1)$ is to be written, a write instruction occurs and a tape-go signal is actuated to cause tape movement. Immediately in response to the write instruction and before the the tape has had a chance to move, the write head gap W is flux actuated to write a marker on the tape, such as by connecting an oscillator signal to write gap W. The marker signal may be turned off before tape begins to move; but at the latest, it must be turned off when block writing is to begin. After the tape has moved a distance D equal to the spacing between the write and read gaps, the read gap R senses the marker and provides a signal indicating that the tape has moved distance D. This signal indication from read gap R is used in FIGURE 2 to terminate the IBG by signalling writing to begin for data block $(K+1)$. The tape acceleration response in FIGURE 2 is such that even the slowest normal tape drive response can accelerate the tape to substantially nominal velocity after the tape has traveled distance D from the stopped tape position. Consequently, the start component of the IBG is a distance function in FIGURE 2 that is independent of the fast or slow acceleration response of its drive, unlike FIGURE 1 where the distance M varies within fixed time-out N according to the fast or slow acceleration response of the particular tape drive.

The marker signal of this invention is only provided in those cases where tape is brought to a stop. Thus, this invention is not utilized in those cases where tape continues to move at nominal velocity across an entire IBG. The decision of whether or not tape moves at nominal velocity across an IBG or stops with the head in the IBG is determined in different ways with different tape controls and computer systems. For example, the computer itself may signal the tape control immediately prior to the writing of a tape block as to whether or not the IBG at the end of the block will be at continuous velocity to the next block or will be stopped. This prior information is made necessary where the tape drive must react to the decision prior to writing the end of a tape data block. With other tape drive designs, the decision prior to the end of the tape block is not necessary and may be made in a very short period of time after the end of writing the tape block. In any case, the time that the next write instruction occurs in reltaion to the end of the last tape block can have a pronounced effect upon the size of the inter-block gap with prior tape systems utilizing the techniques in FIGURE 1. To reduce such inter-block gap variation, means is provided in the tape control for determining if the read instruction occurs within a specified length of time small enough to prevent the reinstruction occurrence from affecting the IBG size. Thus, if the reinstruction occurs outside of the specified time limit, the tape is forced to a stop, but if the reinstruction occurs within the specified time limit, the tape is kept moving at nominal velocity across the IBG. In each case, the IBG is generated by a fixed time delay when the tape is moved at the fixed velocity across the IBG, and the problems of IBG size variations caused by fast and slow acceleration response do not occur in this case because there is very little variation in the nominal speeds among different drives once the acceleration or deceleration periods are over and constant velocity is attained.

Figure 3:
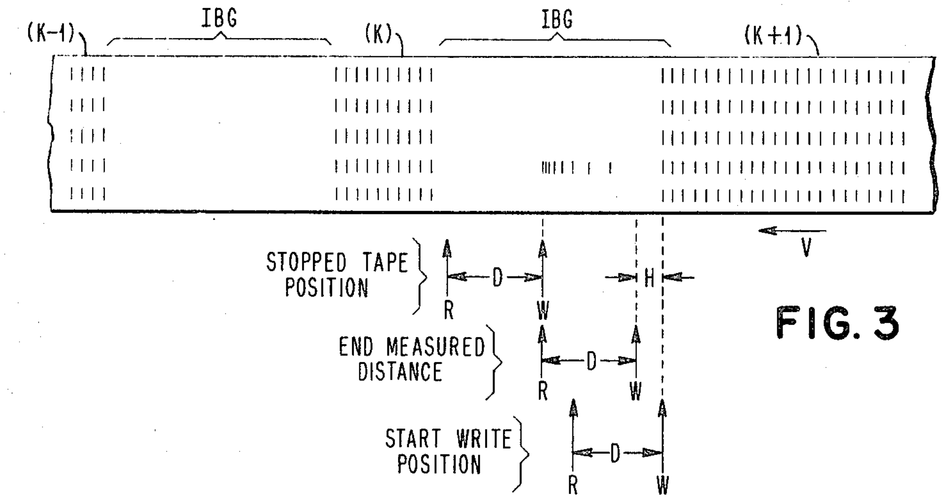

FIGURE 3 shows the situation where the IBG between blocks $(K-1)$ and (K) is generated during continuous tape movement; and the next IBG between blocks (K) and $(K+1)$ is generated with the tape stopping therebetween. Also, the IBG in FIGURE 3 presumes that the gap spacing D is too short to entirely comprise the IBG start component distance; and, therefore, a short time delay $h$ is tacked on to the end of the measured distance D from the tape start marker generated in precisely the same way as explained in connection with FIGURE 2. The tape, therefore, moves an additional distance H in time $h$ to extend the IBG start component.

Figure 4:
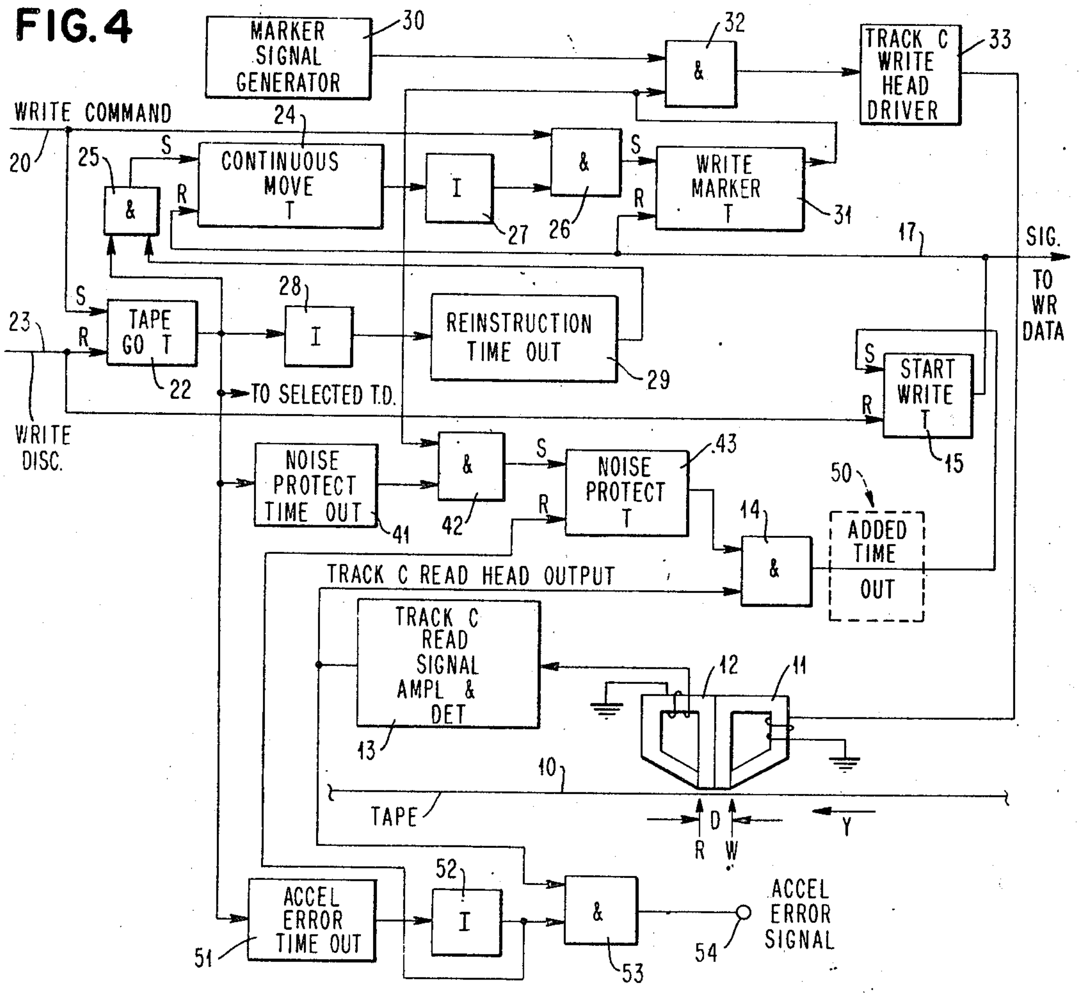
FIGURES 4 and 6 show different embodiments of the invention.

FIGURE 4 illustrates a particular embodiment of the invention for generating the start component of the IBG shown in FIGURES 2 and 3.

In FIGURE 4, a tape 10 is written by the write gap W of a write head 11; and the written data is checked by the read gap R of a read head 12 in the same head assembly. A fixed spacing D is provided between the write gap W and the read gap R operating in relation to the same tape track. Any conventional transfer and recording technique for data on magnetic tape may be used. Such data transfer and recording modulation circuits are found in standard conventional digital tape drives. This conventional aspect therefore is not shown or further discussed in this application.

Writing on tape is initiated by a write command signal received from a computer on an input line 20 shown in FIGURE 4. The write command signal is generally a pulse which sets a tape-go trigger 22. An output of trigger 22 is provided to a selected tape drive to actuate its capstan for driving tape. In many tape drives, tape movement cannot begin until after a period of time, such as one millisecond, during which for example a clutching mechanism must transfer before tape can start moving.

Also, in many tape drives it is necessary to determine if a next write instruction has occurred before the capstan actuator has decoupled due to dropping the tape-go signal after writing the last tape block, such as described and claimed in U.S. patent application Ser. No. 291,359, filed June 28, 1963, and owned by the same assignee. If the actuator is not decoupled, continuous tape velocity is available across the entire IBG, but if decoupling has occurred, it may be necessary to stop the tape in order to reasonably control IBG size. The continuous move versus stop decision is made in FIGURE 4 by a circuit including a continuous move trigger 24 and a reinstruction time-out device 29, which may be a single-shot or delay counter that may time out a period of for example, 275 microseconds. Reinstruction time-out device 29 is actuated by the completion of writing the last tape block, which is signalled by a pulse from the computer on a write disconnect line 23. The write disconnect signal occurs with the transmission of the last data character being written in a tape block. The write disconnect signal resets tape-go trigger 22. The dropping of the tape-go signal actuates reinstruction time-out 29 via invert circuit 28. Then, while actuated, time-out 29 allows the setting of continuous move trigger 24 by enabling an AND gate 25 for the time-out period. Therefore, if a write command occurs during this time-out period to set the tape-go trigger 22, the output of trigger 22 passes through AND gate 25 to continuous move trigger 24. It indicates then that the tape-go signal has been removed for less than the short period of time-out 29 and that tape can continue to be propelled over the IBG at substantially the nominal velocity. On the other hand, if the reinstruction time-out terminates before the next write instruction, AND gate 25 is disabled to prevent the setting of trigger 24, which when not set indicates that the capstan actuator has passed a point of no return; and that the tape-go trigger should be reset (by means not shown) and tape movement stopped.

As previously mentioned, the subject invention is applied to the start operation of tape, and a start can occur only when the IBG is not being generated by a "continuous" write operation. Thus, use of the invention is dependent upon continuous move trigger 24 being in reset status, which status enables an AND gate 26 via an inverter 27. A write command that is brought up after the tape has been stopped finds AND gate 26 enabled, and the write command pulse sets a write marker trigger 31.

An AND gate 32 is conditioned by the set output of trigger 31 to pass a signal from a marker signal generator 30. Generator 30 may be of any several types of circuits; and, for example, it may be an oscillator operating at 20 kc. The marker output is passed from gate 32 to the write head driver 33 in any track C, which is any track in which the marker is chosen to be recorded by means of write head 11 through gap W.

Very soon after the write head is activated (perhaps one millisecond), the tape begins to move in response to the signal from tape-go trigger 22. After the tape has moved a distance D, the read head gap R is brought adjacent the marker previously recorded on tape by write head gap W, in the manner explained with FIGURE 2. The marker signal is detected, amplified and shaped by means of circuit 13 and is transmitted through an enabled AND gate 14, from which it sets start write trigger 15. Trigger 15 then provides a signal that causes writing to begin for the next data block and also simultaneously resets write marker trigger 31 and continuous move trigger 24. As previously stated, the marker signal must cease by the time data writing begins although it could cease at any time after the mark is initially put on tape. It is only the first instance of the mark on tape that is important to this invention.

There is a period of time after recording the marker during which even the slowest expected tape drive cannot have the read head reach the marker signal. Hence, any signal sensed during that time would be unwanted noise. To protect against such noise, AND gate 14 is blocked for a period of time after the initial marker signal is recorded in response to an actuation by the setting of tape-go trigger 22. This period of time, which might be 2.0 milliseconds, is controlled by a noise protect time-out 41, which is actuated by the setting of tape-go trigger 22. While activated, time-out 41 blocks AND gate 42. At the end of the time-out, AND gate 42 is enabled and the set output of write marker trigger 31 passes through gate 42 to set a noise protect trigger 43. After trigger 43 is set, it provides an output that enables AND gate 14 so that the subsequently arriving sensed marker signal can pass through gate 14. Hence, gate 14 is blocked during the period of time-out 41 after tape begins to move.

It is also known that even the slowest expected response tape drive has sufficient acceleration for the tape to move distance D within a certain maximum time period, as long as the tape drive is normally operating. This information is utilized to obtain an acceleration error signal to indicate failure in the acceleration response of the tape, such as might occur upon failure of the capstan actuator. For this purpose an acceleration error time-out 51 is provided which is actuated by the setting of tape-go trigger 22. Time-out 51 is therefore actuated during and somewhat beyond the entire IBG start component period. While time-out 51 is actuated, its output via inverter 52 is blocking an AND gate 53. If after the period of time-out 51, the recorded marker is sensed; then the tape acceleration response is below an acceptable minimum. The recorded marker is sensed by gap R and transmitted through detector 13 and AND gate 53 only if gate 53 is enabled *after* the expiration of the acceleration time-out 51. Thus, a signal provided to output terminal 54 indicates an acceleration error for the tape.

In some cases the gap spacing distance D is too short in relation to the start response of the drive. In this case, the fixed distance determination can still be utilized and a fixed time-out can be tacked to it to extend the start IBG portion, as explained with FIGURE 3. This is done in FIGURE 4 by inserting an added time-out 50 which is actuated by the output of AND gate 14. A pulse is generated from the trailing edge of the period of time-out 50 to set start write trigger 15 to begin writing with the period tacked to the end of the fixed distance determination on tape, which adds distance H to distance D to comprise the IBG start component.

Figure 5:
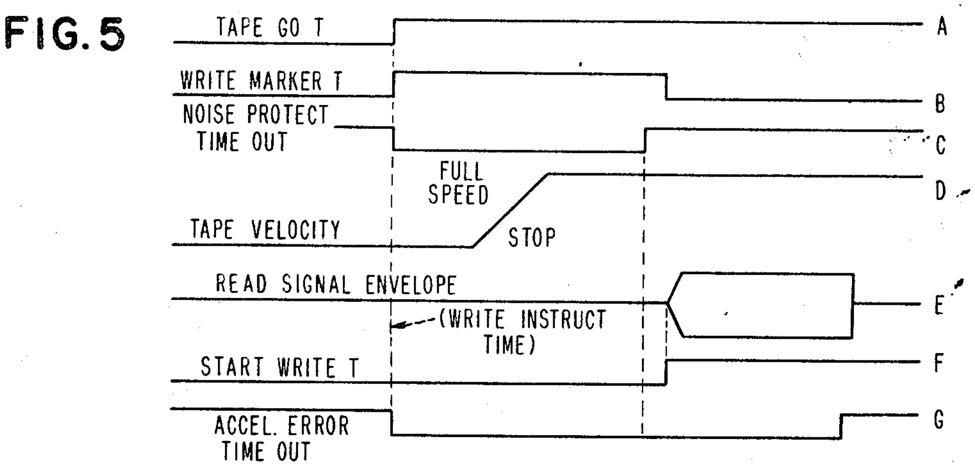
FIGURES 5 and 7 are waveforms used in explaining the respective embodiments in FIGURES 4 and 6.

FIGURE 5 illustrates the waveforms generated by various circuits and triggers in embodiment of FIGURE 4. Thus, it is seen that the tape-go trigger, write marker trigger, noise protect time-out, and acceleration error time-out are all actuated substantially at the time of the write command as shown in FIGURES 5A, B, C and G. It is seen that there is no tape velocity for a substantial time thereafter and that the tape, once actuated, accelerates at a rapid rate to its full speed. Thereafter, the noise protect time-out ends in FIGURE 5C, and then the read signal envelope in FIGURE 5E is sensed by gap R to actuate start write trigger 15 in FIGURE 5F and reset write marker trigger 31 in FIGURE 5B. Some time thereafter the acceleration error time-out occurs in FIGURE 5G to end the cycle of operation of FIGURE 4.

Figure 6:
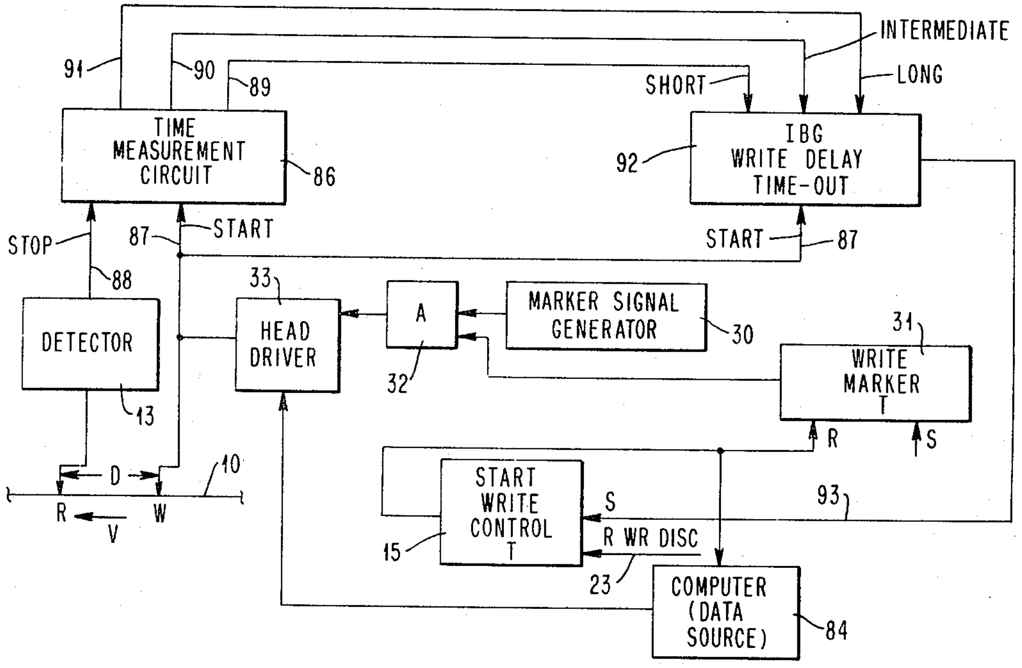

Certain time measurement circuits in relation to the IBG start time were provided in FIGURE 4 for noise protect and for acceleration error check purposes. However, the embodiment in FIGURE 6 includes a time measurement circuit 86 that measures more precisely the time of the tape movement over distance D, and such time measurement is used to determine which available write delay time-out should be used to obtain a substantially constant inter-record gap length under various acceleration responses. The chosen write delay time-out will be inversely proportional to the time measurement with, of course, a minimum time delay being coextensive with the time needed to move the tape distance D, since no time measurement can be obtained until the tape has moved distance D. Thus, in FIGURE 6, tape 10 has been stopped and the same start control circuitry applicable to write marker trigger 31 in FIGURE 4 is also applicable to write marker trigger 31 in FIGURE 6. Thus, upon the tape go actuation, AND gate 32 in FIGURE 6 is actuated to pass a marker signal from generator 30 to write gap W through head driver 33. The marker generator signal is also provided to the start input 87 of time measurement circuit 86, which for example may be a conventional timing counter driven under oscillator control. After the tape has accelerated and moved distance D, the marker is sensed by read gap R; and detector 13 provides a signal to the stop input 88 of time measurement circuit 86. Thus, circuit 86 provides an output proportional to the time during which distance D transpired, and activates one of its outputs 89, 90 and 91 depending upon whether the time was short, intermediate or long, respectively.

The IBG write delay time-out 92 is initially actuated by start input 87, and is deactivated in response to the time measurement output of circuit 86 indicated by a respective one of its three inputs 89, 90 or 91. Thus, if the time measurement is short (indicating fast acceleration), a short time-out is chosen. On the other hand, if the time measurement was long, as indicated by the signal on lead 91, a slow acceleration is indicated and accordingly, a long time-out is chosen for circuit 92. Similarly, an intermediate time measurement of lead 90 chooses a time-out between short and the long durations. At the end of the particularly chosen time-out, an output is provided on lead 93 to the start write trigger 15 which then resets the write marker trigger 31 in the same manner as that of FIGURE 4. Also, in FIGURE 6, which is also pertinent to FIGURE 4, the start write trigger output signals a computer data source 84 to send data to be written by write gap W.

Figure 7:
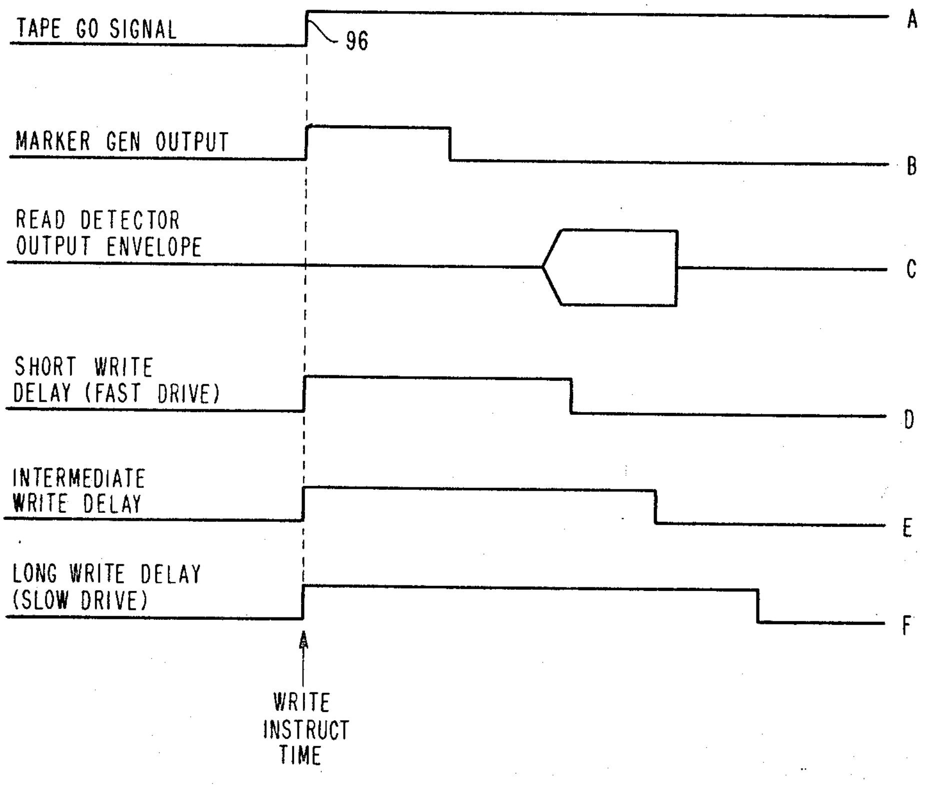

FIGURE 7 illustrates waveforms pertinent to FIGURE 6 wherein the tape-go signal, marker generator output, and short, intermediate and long write delays are all actuated in response to a write instruction, and they are respectively shown in FIGURES 7A, B, D, E and F. After the read detector output envelope is first detected, as shown in FIGURE 7C, one of the three write delays shown in FIGURES 7D, E, F is chosen depending upon the time measurement. At the end of the chosen write delay, a signal is generated at the fall of the chosen write delay time-out which activates the start write control. The plural write delays may be ORed together with the one last actuated overriding any earlier actuated shorter write delay.

Figure 8:
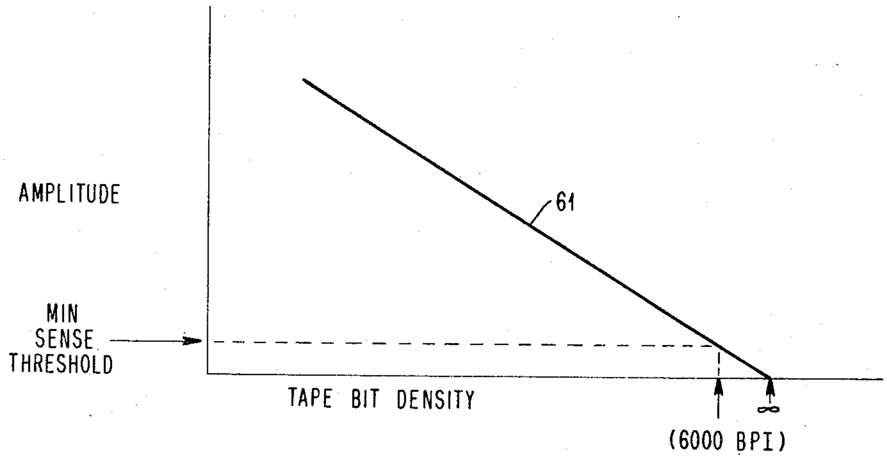
FIGURE 8 shows a recorded density versus sensed amplitude chart.

FIGURE 8 illustrates the response of the tape to a varying density recorded signal, which might be caused by a constant frequency oscillator operating through a write head gap as tape begins to move. The oscillator will cause an infinite density signal to be recorded on tape as long as the tape is not moving; this signal in effect is alternately erasing itself. As soon as the tape begins to move slowly, an extremely high density signal initially is recorded. However, the density very quickly decreases due to the quick acceleration of the tape, once it begins moving. As the read head senses the initial very high density signal, the amplitude is very low and perhaps initially below the minimum sensing threshold of the detector. But very shortly and a negligible distance from the beginning of recording of the marker, the density of signal drops to the point where the amplitude increases above the minimum sense threshold, and the end distance D is signalled. However, if the marker signal generator is only a trigger which switches once upon the write marker trigger being set (which can be directly derived from the set output write marker trigger 31), there will be a precise marking of the tape at the place where the write gap W was stopped.

FIGURE 9 shows the general tape velocity response for tape drives having a capstan actuator. An initial period of time 71 transpires from the initiation of the tape-go signal before any tape movement occurs, such as one millisecond, during which current builds up in the actuator, and the actuator clutch engages. Once the actuator clutch engages, tape movement begins very rapidly and within a period of about 1.5 milliseconds, the tape has accelerated very nearly to normal tape velocity 73.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Means for controlling the size of the start component of an inter-block gap on a recordable surface comprising a write head and a following read head with a predetermined spacing therebetween for operation in a particular track, means for signalling relative movement between said surface and said write head and read head, means for actuating said write head to make a recorded mark on said surface in response to said signalling means, means for indicating the sensing of said recorded mark by said read head to indicate relative movement over said predetermined spacing, time-out means being actuated in response to said indicating means, and data write actuating means responsive to said time-out means to enable the recording of a next data block.

2. Means for controlling the size of an inter-block gap as defined in claim 1 further including noise protect means comprising a noise protect time-out actuated in response to said signalling means, said time-out being less than any expected signal from said indicating means, and means for inhibiting the output of said indicating means for an actuation period of said noise protect time-out.

3. Means for controlling the size of an inter-block gap as defined in claim 1 further including reinstruction control means including a reinstruction time-out responsive to the end of writing the last block, a continuous move trigger reset by a write instruction occurring after the period of said reinstruction time-out, and means for enabling the actuating means to record a marker in response to said continuous move trigger being reset.

4. Means for measuring the inter-block gap acceleration response between a recording surface and a head assembly comprising a write-head gap and a read-head gap included in said head assembly by a fixed distance separation, means for signalling to move said surface relative to said head assembly, means for actuating said write head to record a marker on a surface in response to said signalling means, means for measuring time actuated by said signalling means, said time measuring means actuated at the same time as said write head is actuated to record said marker, means for indicating the sensing of said recorded marker by said read-head gap, and means for comparing an output of said indicating means with said time measuring means to indicate the acceleration response from a stopped tape condition.

5. Means for obtaining a substantially constant start distance component for a recorded inter-block gap comprising a write head and a read head having a fixed spacing, means for actuating said write head to record a marker on a surface, means for signalling to move said surface relative to said heads, means for indicating the sensing of said recorded marker by said read-head gap and providing an output to said time measurement means, time measurement means actuated by said signalling means and said indicating means to provide a time signal, and write delay time-out means responsive to time signal to provide a write delay controlled by said time signal.

References Cited

UNITED STATES PATENTS

| | | | |
|---|---|---|---|
| 2,786,978 | 3/1957 | Warner | 324—70 |
| 2,989,690 | 6/1961 | Cook | 340—174.1 |
| 3,267,448 | 8/1966 | Gunther | 340—174.1 |
| 3,350,511 | 10/1967 | Johnson | 179—100.2 |
| 3,359,548 | 12/1967 | Yoshii et al. | 340—174.1 |

BERNARD KONICK, *Primary Examiner.*

VINCENT P. CANNEY, *Assistant Examiner.*

U.S. Cl. X.R.

179—100.2; 324—70